United States Patent Office
3,432,545
Patented Mar. 11, 1969

3,432,545
3-ARYLOXY-1-AMINO-2-PROPANOLS AND
SALTS THEREOF
Ralph Howe, Macclesfield, England, assignor to Imperial Chemical Industries Limited, London, England, a corporation of Great Britain
No Drawing. Filed Aug. 18, 1964, Ser. No. 390,465
Claims priority, application Great Britain, Sept. 10, 1963, 35,690/63
U.S. Cl. 260—501.17                6 Claims
Int. Cl. C07c 93/00, 93/02

This invention relates to new propanolamine derivatives which possess useful therapeutic properties.

There have previously been described and claimed certain propanolamine derivatives which possess β-adrenergic blocking activity. These derivatives are racemic compounds which have not heretofore been resolved into the corresponding optically active compounds. We have now found that these derivatives and related derivatives can be resolved into the corresponding optically active compounds, that these optically active compounds are β-adrenergic blocking agents, and that they are in certain respects, for example in respect of therapeutic ratio, superior to the parent racemic naphthalene derivatives.

According to the invention we provide optically active propanolamine derivatives of the formula:

wherein R stands for an alkyl, cycloalkyl, alkenyl or aralkyl radical, any of which may optionally be substituted, and Ar stands for a naphthyl radical, optionally substituted, or a substituted phenyl radical, and the esters thereof, and the non-toxic pharmaceutically-acceptable salts thereof.

Preferred compounds of the invention are those that are laevorotatory (—), for example laevorotatory with light of a wavelength of about 5890 angstrom units. It is to be understood that when R contains at least one element of asymmetry, then several diastereoisomeric optically active substances corresponding to that structure can exist, and that these diastereoisoners will, of course, not necessarily possess the same specific rotation. It is further to be understood that in this specification expressions in which there is no mention of substituents, for example the expression "alkyl radical," only encompass the unsubstituted radicals in question.

As a suitable value for R when it stands for an alkyl radical there may be mentioned, for example, an alkyl radical of not more than 10 carbon atoms, for example the n-propyl, isopropyl, n-butyl, isobutyl, s-butyl, t-butyl or 1-methyl-n-butyl radical. As a suitable value for R when it stands for a substituted alkyl radical there may be mentioned, for example, an alkyl radical of not more than 10 carbon atoms bearing one or more hydroxy or alkoxy radicals, for example alkoxy radicals of not more than 5 carbon atoms, for example the methoxy radical. As a suitable value for R when it stands for an aralkyl radical, optionally substituted, there may be mentioned, for example, an aralkyl radical of not more than 12 carbon atoms, optionally substituted with, for example, alkyl or alkoxy radicals, for example alkyl or alkoxy radicals of not more than 5 carbon atoms. Thus, specific values for R when it stands for a substituted alkyl radical or an aralkyl radical are the 2-hydroxy-n-propyl, 2-hydroxy-1, 1-dimethylethyl, benzyl, β-phenylethyl, 1-methyl-3-phenylpropyl or 1,1-dimethyl-3-phenylpropyl radical. As a suitable value for R when it stands for a cycloalkyl radical there may be mentioned, for example, a cycloalkyl radical of not more than 10 carbon atoms, for example the cyclopentyl radical. As a suitable value for R when it stands for an alkenyl radical there may be mentioned, for example, an alkenyl radical of not more than 10 carbon atoms, for example the allyl radical.

As a suitable value for Ar when it stands for a substituted phenyl or naphthyl radical there may be mentioned, for example, a phenyl or naphthyl radical, either of which bears one or more substituents selected from halogen atoms, for example chlorine or bromine atoms, and alkyl or alkoxy radicals of not more than 5 carbon atoms, for example the methyl, ethyl, methoxy or ethoxy radical, and aryloxy radicals of not more than 10 carbon atoms, for example the phenoxy radical, and the hydroxy radical, and alkylene radicals of not more than 4 carbon atoms, for example the trimethylene or tetramethylene radical. As an alternative value for Ar when it stands for a substituted phenyl radical there may be mentioned, for example, a radical of the formula:

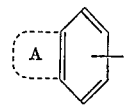

wherein the ring A is a 5-, 6-, 7- or 8-membered heterocyclic ring containing one or more oxygen and/or nitrogen atoms as hetero-atom(s), for example the 5-(1,4-benzodioxanyl) or 6-(1,4-benzodioxanyl) radical.

As one embodiment of the invention there may be mentioned, for example, optically active propanolamine derivatives of the formula:

wherein Ar stands for the 1-naphthyl radical, and R stands for an alkyl or hydroxyalkyl radical of not more than 10 carbon atoms or an aralkyl radical of not more than 12 carbon atoms, and the non-toxic pharmaceutically-acceptable salts thereof.

As specific compounds of the present invention there may be mentioned, for example, (—)-1-isopropylamino-3-(1-naphthoxy)-2-propanol,
(—)-1-isopropylamino-3-(3-tolyloxy)-2-propanol,
(—)-1-(3,5-dimethylphenoxy)-3-(1,1-dimethyl-3-phenylpropylamino)-2-propanol,
(—)-1-allylamino-3-(1-naphthoxy)-2-propanol,
(—)-1-t-butylamino-3-(4-methyl-1-naphthoxy)-2-propanol
(—)-1-(2-hydroxy-1,1-dimethylethylamino)-3-(2-phenoxyphenoxy)-2-propanol, and the non-toxic, phamaceutically-acceptable salts thereof.

As suitable salts there may be mentioned, for example, acid-addition salts having non-toxic, pharmaceutically-acceptable anions, for example salts derived from inorganic acids affording non-toxic, pharmaceutically-acceptable anions, for example hydrochlorides, hydrobromides, phosphates or sulphates, or salts derived from organic acids affording non-toxic, pharmaceutically-acceptable anions, for example oxalates, lactates, tartrates, acetates, salicylates or citrates.

As suitable esters of the optically-active propanolamine derivatives of the invention there may be mentioned, for example, O-esters derived from acids of the formula $R^1.COOH$, wherein $R^1$ stands for an alkyl, alkenyl or aryl radical, for example an alkyl or alkenyl radical of not more than 20 carbon atoms or an aryl radical of not more than 10 carbon atoms, for example the methyl or phenyl radical, and the salts thereof.

According to a further feature of the invention we provide a process for the manufacture of the optically active propanolamine derivatives of the invention which comprises the resolution of a racemic propanolamine derivative of the formula:

Ar.O.CH$_2$.CHOH.CH$_2$.NHR wherein R and Ar have the meanings stated above, by means of an optically active acid, recovering the salts so formed, and subsequently, if so desired, liberating the optically active propanolamine derivatives from the recovered salts by conventional means.

As a suitable optically active acid for use in the above process there may be mentioned, for example, (+)- or (−)-O,O-di-p-toluoyltartaric acid, (+)- or (−)-tartaric acid, (+)- or (−)-camphor-10-sulphonic acid, and (+)- or (−)-3-bromocamphor-8-sulphonic acid. The process may be carried out in a diluent or solvent, for example aqueous methanol.

As stated above, the optically active propanolamine derivatives of this invention are β-adrenergic blocking agents, and they are therefore of value in the treatment or prophylaxis of heart diseases, for example cardiac arrhythmias and angina pectoris.

According to a further feature of the invention, therefore, we provide pharmaceutical compositions comprising one or more optically active propanolamine derivatives of the formula:

Ar.O.CH$_2$.CHOH.CH$_2$.NHR wherein R and Ar have the meanings stated above, or an ester or non-toxic, pharmaceutically-acceptable salt thereof, together with an inert, non-toxic, pharmaceutically-acceptable diluent or carrier.

As suitable compositions there may be mentioned, for example, tablets, capsules, aqueous or oily solutions, aqueous or oil suspensions, emulsions, injectable aqueous or oily solutions or suspensions, or dispersible powders.

The invention is illustrated but not limited by the following examples in which the parts are by weight:

Example 1

11.93 parts of (±)-1-isopropylamino-3-(1-naphthoxy)-2-propanol and 17.7 parts of (−)-O,O-di-p-toluoyltartaric acid are dissolved in 140 parts of methanol at 60° C. and the solution is allowed to cool slowly to ambient temperature. The mixture is filtered and the filtrate is heated until 70 parts of methanol are evaporated. The solution is allowed to cool slowly to ambient temperature. The mixture is filtered and the solid residue is crystallised from methanol repeatedly until the optical rotation becomes constant. There is thus obtained (−)-1-isopropylamino-3-(1-naphthoxy)-2-propanol (−)-hydrogen O,O-di-p-toluoyltartrate hydrate, M.P. 166–167° C. (sintering at approximately 145° C.), $[\alpha]_D^{21}$ −89.0° (C., 1.0 in ethanol).

Example 2

1 part of (−)-1-isopropylamino-3-(1-naphthoxy)-2-propanol (−)-hydrogen O,O-di-p-toluoyltartrate hydrate is shaken together with 20 parts of 0.5 N-sodium hydroxide solution and 60 parts of ether. The mixture is separated, and the ethereal solution is washed with 10 parts of water and then dried over anhydrous magnesium sulphate. The dried ethereal solution is evaporated to dryness. The residual solid is crystallised from light petroleum (B.P. 40–60 °C.) and there is thus obtained (−)-1-isopropylamino-3-(1-naphthoxy)-2-propanol, M.P. 73° C., $[\alpha]_D^{21}$ −10.2° (C., 1.02 in ethanol).

Example 3

Ethereal hydrogen chloride is added gradually at 18–22° C. to a stirred solution of 1 part of (−)-1-isopropylamino-3-(1-naphthoxy)-2-propanol in 25 parts of ether until a slight excess of hydrogen chloride is present. The mixture is filtered. The solid residue is crystallised from a mixture of methanol and ethyl acetate, and there is thus obtained (−)-1-isopropylamino-3-(1-naphthoxy)-2-propanol hydrochloride, M.P. 192° C., $[\alpha]_D^{21}$ −22.7° (C., 1.0 in ethanol).

Example 4

8.41 parts of (±)-1-isopropylamino-3-(3-tolyloxy-2-propanol and 14.55 parts of (−)-O,O-di-p-toluoyltartaric acid are dissolved in 160 parts of methanol at ambient temperature. 80 parts of water are added and the mixture is kept at ambient temperature for 20 hours. The mixture is filtered and the filtrate is kept at ambient temperature for several days until the separation of solid is substantially complete. The mixture is filtered and the residual solid is crystallised from a mixture of methanol and water until the optical rotation becomes constant. There is thus obtained (−)-1-isopropylamino-3-(3-tolyloxy)-2-propanol (−)-hydrogen O,O-di-p-toluoyltartrate, M.P. 160° C., $[\alpha]_D^{20}$ −95.2° (C., 1.0 in ethanol).

Example 5

1 part of (−)-isopropylamino-3-(3-tolyloxy)-2-propanol (−)-hydrogen O,O-di-p-toluoyltartrate is shaken together with 25 parts of 0.5 N-sodium hydroxide solution and 100 parts of ether. The mixture is separated and the ethereal solution is washed three times with 20 parts of water each time, and then dried over anhydrous magnesium sulphate. Ethereal hydrogen chloride is added gradually to the above solution until the separation of solid is substantially complete. The mixture is filtered. The solid residue is crystallised from a mixture of methanol and ethyl acetate, and there is thus obtained (−)-1-isopropylamino-3-(3-tolyloxy)-2-propanol hydrochloride, M.P. 1190 C., $[\alpha]_D^{20}$ −27.4° (C., 1.01 in ethanol).

Example 6

1 part of (−)-1-isopropylamino-3-(3-tolyloxy)-2-propanol hydrochloride is shaken with 20 parts of 0.5 N-sodium hydroxide and 50 parts of ether. The mixture is separated and the ethereal solution is washed three times with 10 parts of water each time, and then dried with anhydrous magnesium sulphate. The dried ethereal solution is evaporated to dryness. 1 part of light-petroleum (B.P. 40–60° C.) is added and the solution is stirred at 0° C. until the separation of solid is substantially complete. The mixture is filtered and the residual solid is crystallised from light-petroleum (B.P. 40–60° C.). There is thus obtained (−)-1-isopropylamino-3-(3-tolyloxy)-2-propanol, M.P. 55° C., $[\alpha]_D^{20}$ −9.9° (C., 0.99 in ethanol).

Example 7

3.41 parts of (±)-1-(3,5-dimethylphenoxy)-3-(1,1-dimethyl-3-phenylpropylamino)-2-propanol and 3.96 parts of (+)-O,O-di-p-toluoyltartaric acid are dissolved in 50 parts of ethyl acetate. The solution is heated, and cyclohexane is added dropwise to the boiling solution until the mixture becomes turbid. The solution is allowed to cool slowly to ambient temperature. The mixture is filtered and the solid residue is crystallised five times from a mixture of ethyl acetate and cyclohexane. There is thus obtained (−)-1-(3,5-dimethylphenoxy)-3-(1,1-dimethyl-3-phenylpropylamino)-2-propanol (+)-hydrogen-O,O-di-p-toluoyltartrate, M.P. 168–169° C. with decomposition, $[\alpha]_D^{20}$ + 68.8° (C., 0.94 in methanol).

The (±)-1-(3,5-dimethylphenoxy)-3-(1,1-dimethyl-3-phenylpropylamino)-2-propanol used as starting material may be obtained as follows:

A mixture of 1.78 parts of 1-(3,5-dimethylphenoxy)-2,3-epoxypropane and 1.63 parts of 1,1-dimethyl-3-phenylpropylamine is heated at 120° C. during two hours. The mixture is then cooled and crystallised from petroleum ether (B.P. 60–80° C.). There is thus obtained (±)-1-(3,5 - dimethylphenoxy)-3-(1,1-dimethyl-3-phenylpropylamino)-2-propanol, M.P. 89–90° C. (corresponding hydrochloride, M.P. 189–190° C., crystallised from ethanol).

Example 8

0.65 part of (—)-1-(3,5-dimethylphenoxy)-3-(1,1-dimethyl-3-phenylpropylamino)-2-propanol (+)-hydrogen O,O-di-p-toluoyltartrate is stirred together with 20 parts of cold N/2 aqueous sodium hydroxide, and the mixture is then extracted with 100 parts of ether in three portions. The ethereal extracts are combined, washed with 50 parts of water in two portions and dried over anhydrous magnesium sulphate. The dried solution is evaporated to remove the ether. The residual base is converted into the hydrochloride by conventional means and the solid obtained is crystallised from ethyl acetate. There is thus obtained (—)-1-(3,5-dimethylphenoxy)-3-(1,1-dimethyl-3-phenylpropylamino)-2-propanol hydrochloride, M.P. 142–144° C., $[\alpha]_D^{20}$ —15.2° (C., 2.55 in methanol).

Example 9

A solution of 7 parts of (±)-1-allylamino-3-(1-naphthoxy)-2-propanol in 20 parts of methanol is mixed with a solution of 9.25 parts of (—)-O,O-di-p-toluoyltartaric acid in 30 parts of methanol. 300 parts of water are added. The mixture is kept at ambient temperature for 48 hours, by which time crystallisation is complete. The crystalline salt is recovered by filtration, dried at 60° C., and then crystallised once from a mixture of methanol and ethyl acetate and then twice from methanol. There is thus obtained (—)-1-allylamino-3-(1-naphthoxy)-2-propanol (—)-hydrogen O,O-di-p-toluoyltartrate, M.P. 169.5° C., $[\alpha]_D^{20}$ —97° (C., 1.48 in methanol).

The (±)-1-allylamino-3-(1-naphthoxy) - 2 - propanol [M.P. 64–66° C., crystallised from a mixture of benzene and petroleum ether (B.P. 40–60° C.)] used as starting material may be obtained by conventional means from the corresponding hydrochloride.

Example 10

2 parts of (—)-1-allylamino-3-(1-naphthoxy)-2-propanol (—)-hydrogen O,O-di-p-toluoyltartrate are suspended in 30 parts of water, and the mixture is basified with 10 N-sodium hydroxide solution. After being shaken for 15 minutes, the mixture is extracted 3 times, each time with 50 parts of ether. The ethereal extracts are washed once with 50 parts of 2 N-sodium hydroxide solution, and then 3 times, each time with 30 parts of water. The ethereal solution is dried with anhydrous magnesium sulphate, and then evaporated to dryness. The solid residue is crystallised from petroleum ether (B.P. 100–120° C.). There is thus obtained (—)-1-allylamino-3-(1-naphthoxy)-2-propanol, M.P. 62–63.5° C., $[\alpha]_D^{20}$ —6.1° (C., 1.78 in methanol).

Example 11

To a solution of 0.287 part of (±)-1-t-butylamino-3-(4-methyl-1-naphthoxy)-2-propanol in 10 parts of ether there is added a solution of 0.38 part of (+)-O,O-di-p-toluoyltartaric acid in 10 parts of ether. The precipitated salt is recovered by filtration, and is dissolved in 48 parts of boiling ethanol. The solution is slowly cooled to ambient temperature and the resulting mixture is filtered. The solid residue is washed with cold ethanol and then dried. There is thus obtained (—)-1-t-butylamino-3-(4-methyl-1-naphthoxy)-2-propanol (+)-hydrogen O,O-di-p-toluoyltartrate, M.P. 196–197° C. with decomposition, $[\alpha]_D^{20}$ +34.4° (C., 0.8 in dimethyl-formamide).

The (±)-1-t-butylamino-3-(4-methyl-1-naphthoxy)-2-propanol used as starting material may be obtained as follows:

A mixture of 2.5 parts of 1-chloro-3-(4-methyl-1-naphthoxy)-2-propanol and 10 parts of t-butylamine is heated in a sealed vessel at 100° C. for 10 hours. The vessel is cooled and the contents are evaporated to dryness under reduced pressure. The residue is acidified with 25 parts of 2 N-hydrochloric acid, and washed with 25 parts of ether. The aqueous solution is basified with 2 N-sodium hydroxide solution and extracted with ethyl acetate. The ethyl acetate extract is dried over anhydrous magnesium sulphate and evaporated to dryness. The residue is crystallised from cyclohexane and there is thus obtained (±)-1-t-butylamino-3-(4-methyl-1-naphthoxy)-2-propanol, M.P. 90–92° C.

Example 12

A solution of 0.18 part of (—)-1-t-butylamino-3-(4-methyl-1-naphthoxy)-2-propanol (+)-hydrogen O,O-di-p-toluoyltartrate in water is basified with 2 N-sodium hydroxide solution. The mixture is extracted with ether. The ethereal extract is acidified with ethereal hydrogen chloride. The mixture is filtered, and the solid residue is washed with ether, dried, and then crystallised from ethyl acetate. There is thus obtained (—)-1-t-butylamino-3-(4-methyl-1-naphthoxy) - 2 - propanol hydrochloride, M.P. 170–171° C., $[\alpha]_D^{20}$ —6.7° (C., 1.8 in methanol).

Example 13

To a warm solution of 1.65 parts of (±)-1-(2-hydroxy-1,1 - dimethylethylamino)-3-(2-phenoxyphenoxy)-2-propanol in 5 parts of ethanol there is added 0.75 part of (+)-tartaric acid in 5 parts of ethanol. The solution is cooled and the resulting mixture is filtered. The solid residue is crystallised twice from ethanol. There is thus obtained (—)-1-(2 - hydroxy-1,1-dimethylethylamino)-3-(2-phenoxyphenoxy) - 2 - propanol (+)-hydrogen tartrate, M.P. 146–148° C., $[\alpha]_D^{20}$ —9.6° (C. 0.5 in water).

The (±)-1-(2 - hydroxy-1,1-dimethylethylamino)-3-(2-phenoxyphenoxy)-2-propanol used as starting material may be obtained as follows:

A mixture of 4.4 parts of 1,2-epoxy-3-(2-phenoxyphenoxy)propane and 33 parts of 2-hydroxy-1,1-dimethylethylamine is heated at 90° C. for 3 hours. The resulting mixture is stirred with 250 parts of water, and then acidified with hydrochloric acid at 90° C. The mixture is cooled and filtered. The solid residue is washed with water, dried, and crystallised from ethanol. There is thus obtained (±)-1-(2 - hydroxy-1,1-dimethylethylamino)-3-(2 - phenoxyphenoxy) - 2 - propanol hydrochloride, M.P. 206–207° C. The corresponding base is obtained by conventional means and has M.P. 129–131° C. (crystallised from ethanol).

Example 14

A solution of 4 parts of (—)-1-(2-hydroxy-1,1-dimethylethylamino) - 3 - (2-phenoxyphenoxy)-2-propanol (+)-hydrogen tartrate in 10 parts of water is basified with 2 N-sodium hydroxide solution. The mixture is extracted with ethyl acetate, and the ethyl acetate extract is washed with water, dried with anhydrous magnesium sulphate, and evaporated to dryness. The residue is crystallised from cyclohexane and there is thus obtained (—)-1-(2-hydroxy-1,1-dimethylethylamino)-3-(2 - phenoxyphenoxy)-2-propanol, M.P. 114° C., $[\alpha]_D^{20}$ —9.8° (C., 1.7 in ethanol).

Example 15

A mixture of 10 parts of (—)-1-isopropylamino-3-(1-naphthoxy)-2-propanol hydrochloride and 80 parts of mannitol is passed through a 60-mesh screen. Sufficient of a 10% aqueous solution of gelatin is then added to make a stiff paste. The paste is passed through a 16-mesh screen, dried at 60° C. and then passed through a 20-mesh screen. To the resulting granules there are added 6 parts of alginic acid and 2 parts of magnesium stearate. The mixture is compressed into tablets by known means, and there are thus obtained tablets suitable for therapeutic purposes.

What I claim is:

1. A laevorotatory propanolamine derivative selected from the group consisting of laevorotatory compounds of the formula:

Ar.O.CH$_2$.CHOH.CH$_2$.NHR wherein R is selected from the group consisting of alkyl of 3 to 5 carbon atoms, hydroxyalkyl of 3 to 5 carbon atoms, allyl, cyclopentyl, benzyl, β-phenethyl, 1-methyl-3-phenylpropyl and 1,1-dimethyl-3-phenylpropyl and Ar is selected from the group consisting of naphthyl, methyl-naphthyl, di-methylphenyl and phenoxyphenyl; and the non-toxic pharmaceutically-acceptable salts of said compounds.

2. (—) - 1 - isopropylamino - 3 - (1-naphthoxy)-2-propanol and the non-toxic pharmaceutically-acceptable salts thereof.

3. A compound selected from the group consisting of (—)-1-(3,5 - dimethylphenoxy)-3-(1,1 - dimethyl-3-phenyl-propylamino)-2-propanol and the non-toxic pharmaceutically-acceptable salts of said compounds.

4. A compound selected from the group consisting of (—)-1-allylamino - 3 - (1-naphthoxy)-2-propanol and the non-toxic pharmaceutically-acceptable salts of said compounds.

5. A compound selected from the group consisting of (—)-1-t-butylamino - 3 - (4 - methyl-1-naphthoxy)-2-propanol and the non-toxic pharmaceutically-acceptable salts of said compounds.

6. A compound selected from the group consisting of (—)-1-(2-hydroxy - 1,1 - dimethylethylamino)-3-(2-phenoxyphenoxy)-2-propanol and the non-toxic pharmaceutically-acceptable salts of said compounds.

References Cited

UNITED STATES PATENTS

| 3,033,640 | 5/1962 | Hofer et al. | 260—570.7 XR |
| 3,203,992 | 8/1965 | Kunz et al. | 260—570.7 |
| 3,275,629 | 9/1966 | Baizer | 260—570.7 XR |

FOREIGN PATENTS 622,297  4/1949  Great Britain.

OTHER REFERENCES

Burger: "Medicinal Chemistry," and Ed., pp. 44–45 (1960).

Beasley et al.: Jour. Pharm. and Pharmacol," vol. 10, pp. 50–52 (1958).

Karrer, "Organic Chemistry," 2nd English Ed., pp. 93–103 (1946).

Lunsford et al.: "Jour. American Chemical Society," vol. 82, pp. 1166–71 (1960).

Petrow et al.: "Jour. Pharm and Pharmacol," vol .8, pp. 667–9 (1956).

CHARLES B. PARKER, *Primary Examiner.*

R. V. HINES, *Assistant Examiner.*

U.S. Cl. X.R.

260—404, 488, 477, 475, 501.18, 501.19, 570.7, 348, 340.5, 340.6, 486, 999